United States Patent [19]

Holness

[11] Patent Number: 5,631,926

[45] Date of Patent: May 20, 1997

[54] APPARATUS FOR COMPRESSING DATA BY PROVIDING A CODED MESSAGE INDICATIVE OF THE DATA AND METHOD OF USING SAME

[76] Inventor: Peter J. Holness, BAe Defence Ltd, Six Hills Way, Stevenage, Herts, Great Britain, SG1 2DA

[21] Appl. No.: 715,487

[22] Filed: Sep. 18, 1996

Related U.S. Application Data

[63] Continuation of Ser. No. 322,458, Oct. 14, 1994, abandoned, which is a continuation-in-part of Ser. No. 257,425, Jun. 8, 1994, Pat. No. 5,483,473, which is a continuation of Ser. No. 869,006, Apr. 16, 1992, abandoned.

[30] Foreign Application Priority Data

| Apr. 9, 1991 | [GB] | United Kingdom | 9108467 |
| Oct. 15, 1993 | [GB] | United Kingdom | 9321367 |

[51] Int. Cl.$^6$ ............................................ H04B 1/66
[52] U.S. Cl. ............................................ 375/240
[58] Field of Search .................... 375/240; 370/118; 327/106; 341/110; 364/718, 851

[56] References Cited

U.S. PATENT DOCUMENTS

| 4,475,169 | 10/1984 | Gilbert | 364/817 |
| 4,476,538 | 10/1984 | Gilbert | 364/817 |
| 4,905,002 | 2/1990 | Jones et al. | |
| 5,109,437 | 4/1992 | Honda | |
| 5,136,618 | 8/1992 | Wright, Jr. | 375/240 |
| 5,483,473 | 1/1996 | Holness | 364/718 |

FOREIGN PATENT DOCUMENTS

| 509713 | 10/1992 | European Pat. Off. |
| 2111245 | 6/1983 | United Kingdom |
| 2250372 | 6/1992 | United Kingdom |
| 864702 | 8/1986 | WIPO |

*Primary Examiner*—Stephen Chin
*Assistant Examiner*—Jeffrey W. Gluck
*Attorney, Agent, or Firm*—Cushman, Darby & Cushman IP Group of Pillsbury Madison & Sutro LLP

[57] ABSTRACT

Apparatus and method for data compression in which a coded message representing a digital bit stream is transmitted over a low bandwidth transmission link and received by apparatus which includes a calculator operable to create a sequence of output values comprising the calculated result of a generator equation. The output values comprising a digital bit stream may be converted to analogue form by a digital to analogue converter. By clocking the output of the waveform generating apparatus asynchronously, with respect to its inputs, a high level of data compression occurs.

14 Claims, 2 Drawing Sheets

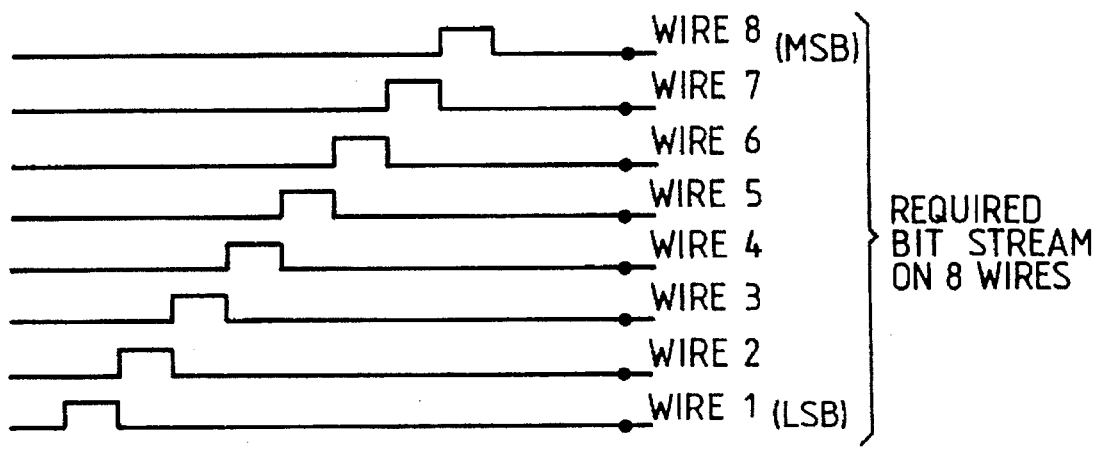

APPARATUS FOR COMPRESSING DATA BY PROVIDING A CODED MESSAGE INDICATIVE OF THE DATA AND METHOD OF USING SAME

This is a continuation of application Ser. No. 08/322,458, filed on Oct. 14, 1994, which was abandoned upon the filing hereof which is a continuation-in-part of U.S. patent application Ser. No. 08/257,425, filed Jun. 8, 1994, which issued as U.S. Pat. No. 5,483,473, which is a continuation of U.S. patent application Ser. No. 07/869,006, filed Apr. 16, 1992, now abandoned.

BACKGROUND OF THE INVENTION

1. Field of the Invention

This invention relates to apparatus for and methods of data compression.

2. Description of the Related Art

Transmission of large amounts of information requires very large transmission bandwidths. This necessitates the use of costly communication channels for transmission with the consequent increasing demand on available communication bandwidths in both space and terrestrial systems. Also, the storage of large amounts of data requires the use of costly and large storage means.

SUMMARY OF THE INVENTION

An object of this invention is to provide a device for reducing the amount of data that has to be stored or transmitted, hence reducing the load on the associated communications channel or storage means.

According to this invention, data compression apparatus includes a:

means for generating a coded message representing a corresponding digital bit-stream and for transmitting the coded message over a transmission path. A digital bit-stream-generating means receives the coded message and generates the corresponding digital bit-stream. The digital bit-stream-generating means includes a calculator means operable to receive a set of input values which form an argument of a generator equation and to create a sequence of output values, each comprising the calculated result of a generator equation.

The duration and composition of the digital bit-stream may be dictated by the coded message.

If an analogue waveform is required to be generated, then the output of the calculator can be converted to analog form by the addition of a digital to analogue converter (DAC). The waveshape, frequency and other characteristic parameters of the generated waveform are again controlled by the content of the coded message. The clocking rate of the DAC is either fixed or controlled remotely by means of the coded message.

By clocking the output of the calculator means asynchronously with respect to its inputs, a high level of data compression occurs.

The use of a coded message, as a communications protocol rather than transmitting a complex waveform, greatly reduces the bandwidth requirement of the transmission path. For example, many analog waveforms can be specified in coded form by a short burst of ASCII bits via a 1200–9600 baud serial databus.

The embodiments of the invention exploit the principle of bit stream generation by which a sequence of output values are created, each value being the calculated result of a generator equation for a specified input value, which in turn forms the argument of said generator equation.

Generator equations and their use in waveform generation are described in greater detail in our co-pending European Application EP-A-509,713. Therein, certain generator equations, for example the inverse of a trigonometric function, i.e., arccos(sin P) are referred to as "Portmanteau functions". Herein, a generator equation can be any Portmanteau function.

This invention utilizes the Portmanteau functions as a data communications protocol, e.g., the coded message has the form of a Portmanteau function or "token" requiring very little bandwidth to transmit. For example, an ascending/descending ramp could be specified by the token: ±,P,–1,1, 1E5 with the above five fields as follows:

Polarity (ascending/descending)
Ramp Portmanteau function, i.e., y=P
Lower P limit (or "start angle")
upper P limit (or "stop angle")
frequency (100 KHz).

Alternatively, the second field could be represented by the Portmanteau Function y (P)=arc tan (tan P/2) using a pre-set number of P values between $-\pi$ and $+\pi$. With the above five field token, an ascending/descending binary stream (from 0 to 255 in decimal form, say) would be generated at the output of the calculator. The rate at which the bit stream could be clocked out of the calculator can be controlled by the coded message (i.e., the fifth field) up to a maximum value set by the capabilities of the calculator means. This upper limit will dictate the bandwidth of the information appearing at the calculator outputs.

Because the rate at which data is clocked out of the calculator can be set as arbitrarily high as the associated hardware can manage, vast data compression ratios can be achieved by the present invention. Exact values will, of course, depend on hardware, software and protocols. By making a few assumptions and strictly by way of example, a compression ratio can be calculated as follows:

Assume that a sample token is sent across the transmission path (which might be a wire or a radio link for example) in eighty bits. Suppose the calculating means operates at 2.048 MHz, thus producing at its output digital bit stream sequences 2048 bytes long. Assuming a bus bit precision of 8, the information present at the calculator output is equivalent to:

2048×8=16384 bits

The compression ratio is thus $$\frac{16384}{80} \approx 205{:}1$$

BRIEF DESCRIPTION OF THE DRAWINGS

Some embodiments of the invention will now be described, by way of example only, with reference to the drawings of which:

FIGS. 2A and 2B represent logic levels relating to the output of the first embodiment of FIG. 1.

DETAILED DESCRIPTION OF THE PREFERRED EMBODIMENTS

Figure 1:
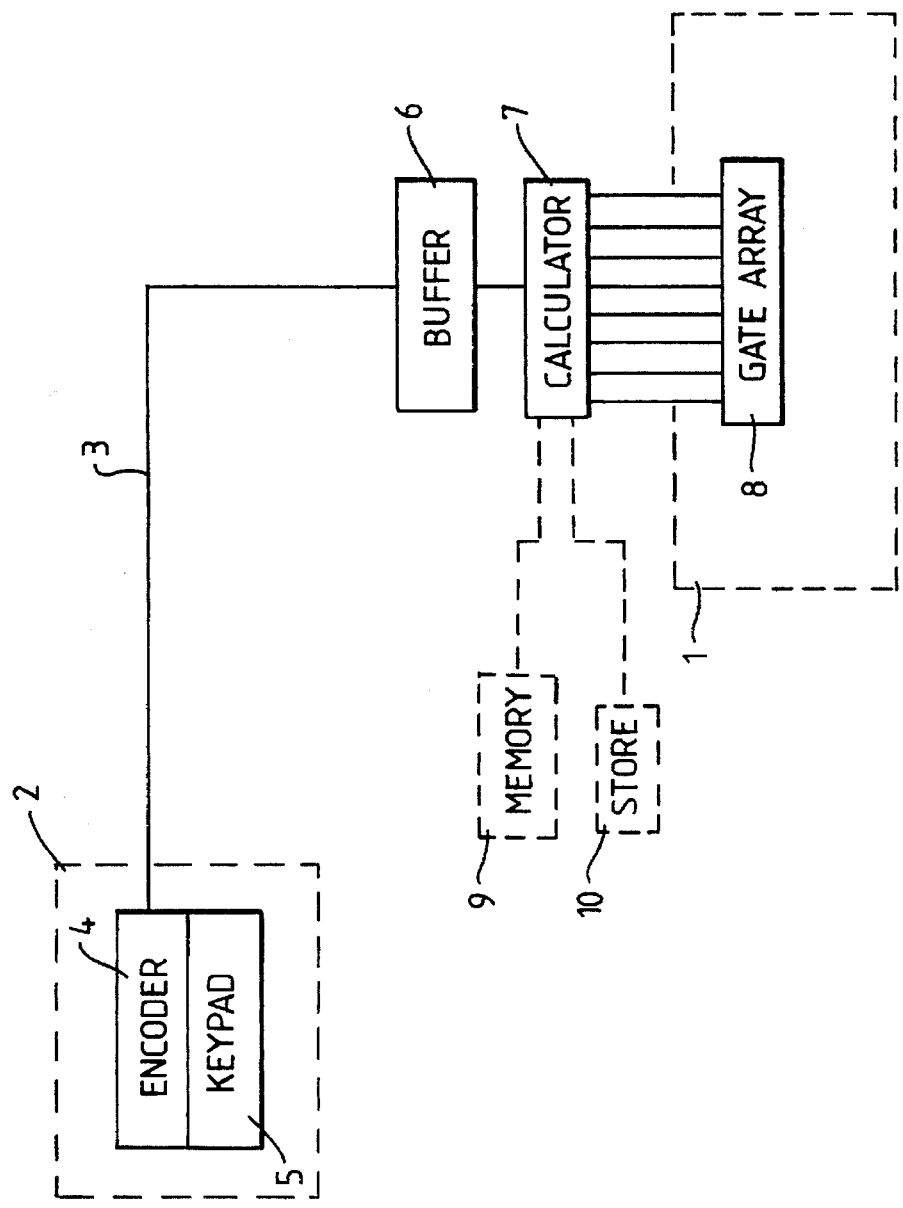
FIG. 1 is a schematic block diagram of an embodiment for switching a logic gate array.

In the example of FIG. 1, the invention is used to operate a remote switching circuit 1 which is linked to a control station 2 via a low bandwidth transmission path 3. The transmission path 3 could be a simple electrical conductor, fibre-optic cable, or radio link, for example.

The control station 2 includes an encoder 4 and associated keypad 5. The output from the encoder is linked via the transmission path 3 to a buffer 6 whose output in turn is fed to a calculator 7. The calculator 7 has eight digital output lines which are connected to a logic gate array 8 which forms part of the switching circuit 1.

The keypad 5 is used to type into the encoder 1 a Portmanteau Function, [y=f(P) in the general case] appropriate values of P between pre-chosen limits, and a command setting the clocking rate of the calculator. The encoder 4 converts this received information (which constitutes a coded message) into ASCII form and transmits it over the transmission path 3. The buffer 6 receives the information and processes it into a form which is readable by the calculator. The calculator 7 is pre-programmed with the necessary algorithms for calculating successive values of y for each value of P received via the buffer 6. The calculated values of y are clocked out of the calculator 7 at a rate set by the keypad operator. These values appear as a sequence of numbers, but in binary form (eight bits in this example) at the outputs of the calculator 7 and are used to switch the logic gate array 8.

In this specific example, suppose there is a requirement for each gate associated with each of the eight outputs from the calculator to be held at a logic high level in succession, i.e., that the bit streams at each of the eight outputs should be as represented in FIG. 2A with the corresponding Boolean states and decimal word values as shown in FIG. 2B. Each Boolean state in succession corresponds therefore to the decimal words 0,1,2,4,8,16,32,64 and 128.

This can be achieved by choosing a Portmanteau Function $y=2^P$ for values of P equalling 0,1,2,3,4,5,6 and 7. Hence, the expression for y and values for P are typed via the keypad 5 into the encoder 4 for use by the calculator 7. Subsequently each gate in the array 8 is switched in succession by the action of the calculator 7.

By keying in different generator equations, almost any desired bit stream can be provided at the calculator's outputs.

The above embodiment could be modified by storing the aforesaid P values in a memory 9 to which the calculator has direct access, rather than transmitting them over the transmission path with the generator equation.

Similarly, the Portmanteau Function(s) could be stored in a store 10 to which the calculator has direct access, rather than transmitting the function(s) over the transmission path. In this case the coded message could comprise a store address location so that the calculator could access the appropriate stored function(s).

In further alternative embodiments, the keypad is dispensed with and any relevant information (for instance the Portmanteau Function(s) and P values) is either stored in a memory accessible to the encoder or made available via an on-the-fly buffer/processor.

What is claimed is:

1. A data compression apparatus comprising:
   means for generating a message representing a digital bit stream, said message including at least one of a Portmanteau generator equation and a set of values defining an argument for said Portmanteau generator equation; and
   digital bit-stream-generating means receiving said message and generating said digital bit stream based on said information contained in said message, said digital bit-stream generating means including processing means having an input and an output, said processing means receiving at said input said Portmanteau generator equation and said set of values defining said argument for said Portmanteau generator equation, said processing means generating a sequence of output values corresponding to a calculated result of said generator equation and said set of values, said sequence of output values defining said digital bit stream.

2. A data compression apparatus according to claim 1, wherein said message is transmitted via a serial databus.

3. A data compression apparatus according to claim 1, wherein said message is transmitted in ASCII form.

4. A data compression apparatus according to claim 1, wherein said message generated by said means for generating a message includes information indicative of a clock rate at with said processing means is to output said digital bit stream.

5. A data compression apparatus according to claim 1, wherein said output of said processing means is clocked asynchronously with respect to said input thereof.

6. A data compression apparatus comprising:
   means for generating a message representing a digital bit stream, said message including at least one of first information indicative of a Portmanteau generator equation and second information indicative of a set of values defining an argument for said Portmanteau generator equation; and
   and digital bit-stream-generating means receiving said message and generating said digital bit stream based on said information contained in said message, said digital bit-stream generating means including:
   processing means having an input and an output, said processing means receiving at said input said Portmanteau generator equation and said set of values defining an argument for said Portmanteau generator equation, said processing means generating a sequence of output values corresponding to a calculated result of said generator equation and said set of values, said sequence of output values defining said digital bit stream, and
   means for providing said Portmanteau generator equation and said set of values to said input of said processing means based on at least one of said first information in said message indicative of said Portmanteau generator equation and said second information indicative of said set of values defining said argument for said Portmanteau generator equation.

7. A data compression apparatus according to claim 6, further comprising:
   a storage device for storing a plurality of said Portmanteau generator equations; and
   a means for selecting one of said plurality of Portmanteau generator equations corresponding to said Portmanteau generator equation indicated in said message based on said first information in said message indicative of said Portmanteau generator equation.

8. A data compression apparatus according to claim 6, further comprising:
   a storage device for storing a plurality of sets of values which form said argument for said Portmanteau generator equation; and
   a means for selecting one of said plurality of sets of values corresponding to said set of values indicated in said message based on said second information in said message indicative of said set of values.

9. A data compression apparatus according to claim 6, wherein said message generated by said means for generating said message includes information indicative of a clock rate at with said processing means is to output said digital bit stream.

10. A data compression apparatus according to claim 6, wherein said output of said processing means is clocked asynchronously with respect to said input thereof.

11. A method of data compression including:

generating a message representing a digital bit stream, said message including at least one of a Portmanteau generator equation and a set of values defining an argument for said Portmanteau generator equation;

providing said message to a digital bit-stream-generator which generates said digital bit stream based on said information contained in said message, said digital bit-stream generator including a processor having an input and an output, said processor receiving at said input said Portmanteau generator equation and said set of values defining an argument for said Portmanteau generator equation; and generating, using said processor, a sequence of output values corresponding to a calculated result of said generator equation and said set of values, said sequence of output values defining said digital bit stream.

12. A method of data compression according to claim 11, wherein said output of said processor is clocked asynchronously with respect to said input thereof.

13. A method of data compression including:

generating a message representing a digital bit stream, said message including at least one of first information indicative of a Portmanteau generator equation and second information indicative of a set of values defining an argument for said Portmanteau generator equation;

providing said message to a digital bit-stream-generator which generates said digital bit stream based on said information contained in said message, said digital bit-stream generator including a processor having an input and an output;

providing said Portmanteau generator equation and said set of values to said input of said processor based on at least one of said first information in said message indicative said Portmanteau generator equation and said second information indicative of said set of values; and generating, using said processor, a sequence of output values corresponding to a calculated result of said generator equation and said set of values, said sequence of output values defining said digital bit stream.

14. A method of data compression according to claim 13, wherein said output of said processor is clocked asynchronously with respect to said input thereof.

* * * * *